2 Sheets--Sheet 1.

J. A. CONOVER.

Machine for Splitting Wood.

No. 6,541. Reissued July 13, 1875.

Witnesses:

Peter Van Antwerp

Thomas Van Antwerp

Inventor:

Jacob A. Conover

2 Sheets--Sheet 2.
J. A. CONOVER.
Machine for Splitting Wood.
No. 6,541. Reissued July 13, 1875.
Fig 3. A a
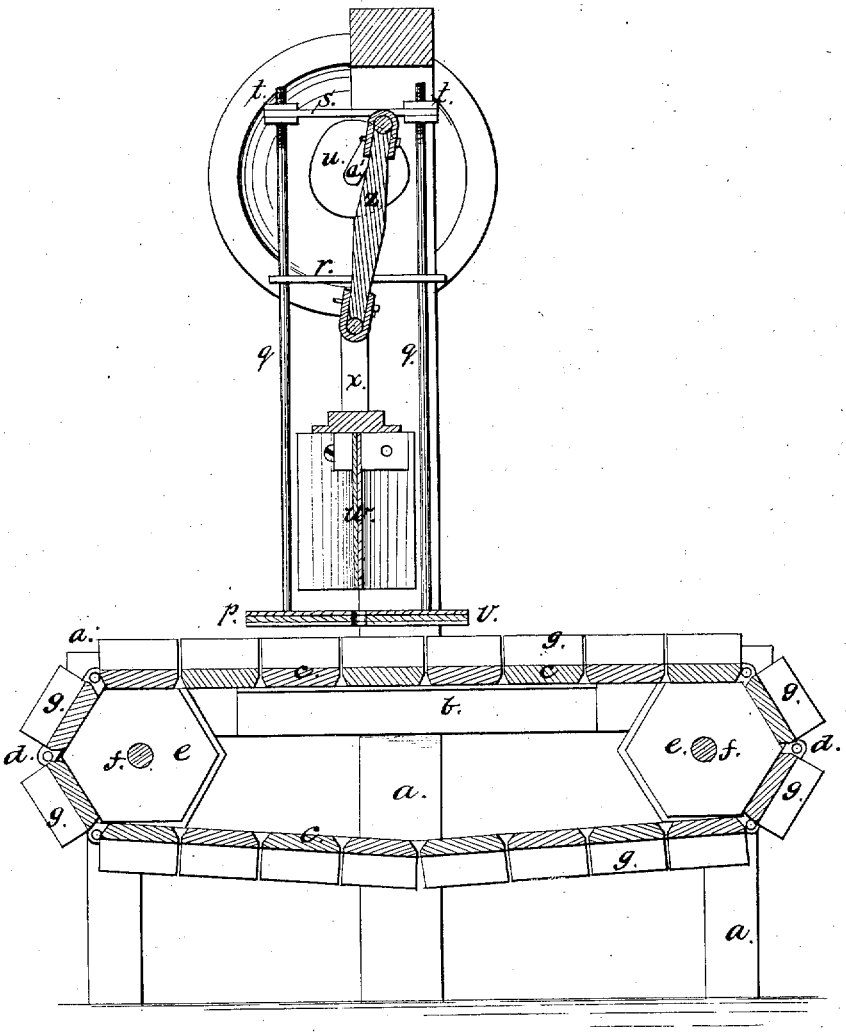
Fig. 4. B, b,
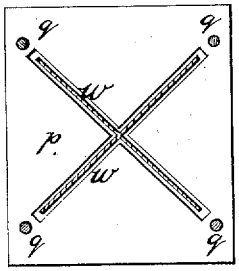
Witnesses:
Peter Van Antwerp
Thomas Van Antwerp
Inventor:
Jacob A. Conover

UNITED STATES PATENT OFFICE.

JACOB A. CONOVER, OF NEW YORK, N. Y.

IMPROVEMENT IN MACHINES FOR SPLITTING WOOD.

Specification forming part of Letters Patent No. 12,857, dated May 15, 1855; extended seven years; reissue No. 6,541, dated July 13, 1875; application filed April 16, 1875.

*To all whom it may concern:*

Be it known that I, JACOB A. CONOVER, of the city, county, and State of New York, have invented a new and Improved Machine for Splitting Kindling-Wood, of which the following is a full, clear, and exact description, reference being had to the accompanying drawings, making part of this specification, in which—

Figure 2:
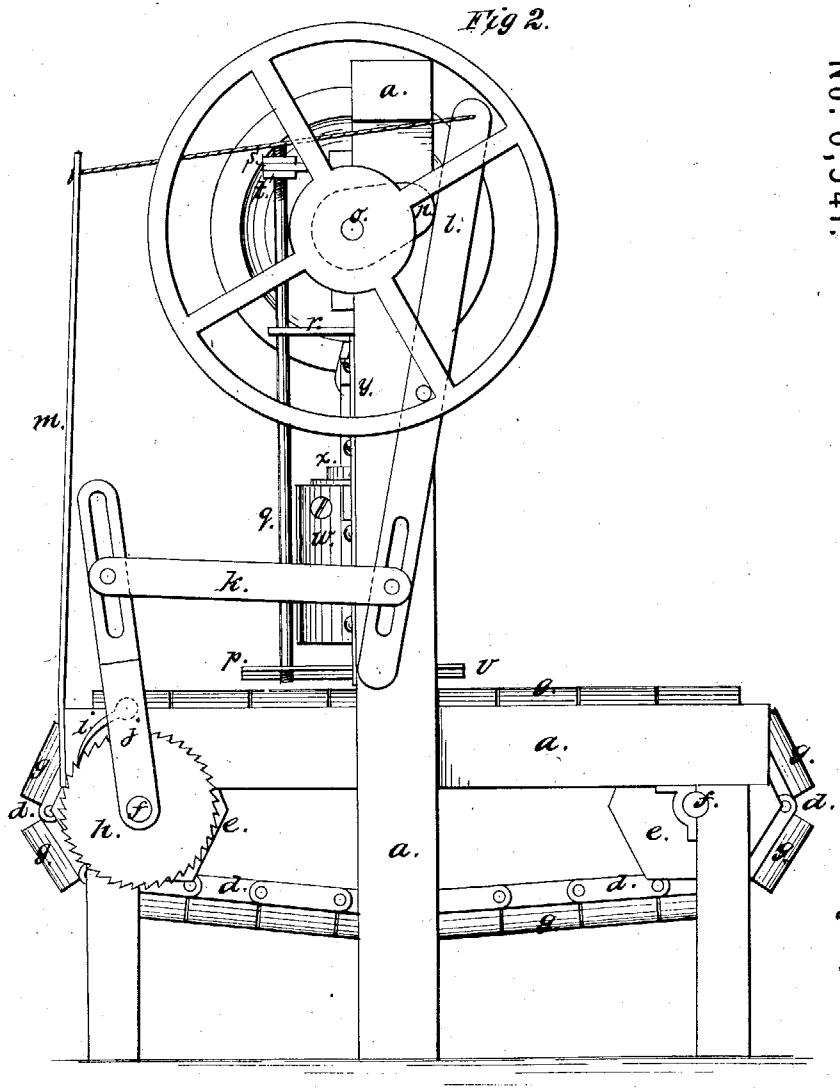
Figure 1:
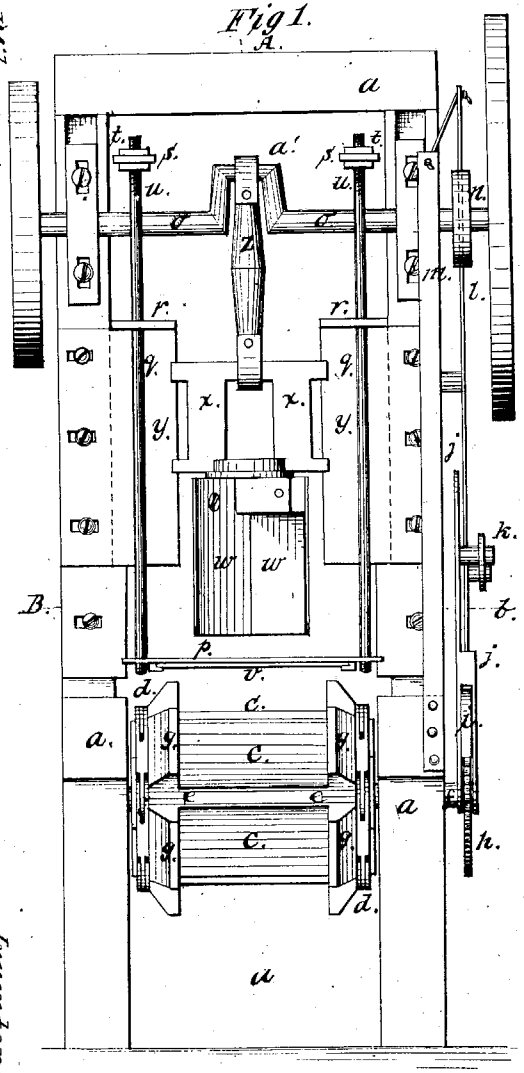

Figure 1 is a front elevation of the machine; Fig. 2, a side elevation; Fig. 3, a longitudinal vertical section taken at the line A *a* of Fig. 1; and Fig. 4, a horizontal section taken at the line B *b* of Fig. 1, showing the knives *w* and plate *p*.

The same letters indicate like parts in all the figures.

In my said invention the blocks of wood to be split, and which have been previously sawed of the required length, are carried forward upon a bed, upon which they are held stationary while being subjected to the splitting action of the knife. The carriage, for convenience, I prefer to make in section, linked together in the form of an endless chain, passing over a suitable frame or table, by which the wood is sustained against the downward pressure of the knife, and around wheels or drums at each end. By means of a suitable feed-motion the carriage is moved by an intermittent motion to carry the blocks forward under the action of the splitting-knives, attached to a stock which has a positive reciprocating motion at right angles to the surface on which the butts of the blocks bear, and in line with the grain of the wood to be split, the wood being stationary while subjected to the action of the blades of the knife, the carriage forming a part of the bed, which, at the time, supports the wood. As the cutters rise they are cleared from the blocks by a clearing-plate placed above and provided with suitable apertures, in which the cutters play freely; and with the view to the better operation of this clearing-plate, and to make it answer the additional purpose of a holder, its under surface is provided with an elastic pad of india-rubber, or other elastic substance. The plate receives an intermittent up-and-down motion to make it press upon and hold the blocks during the operation of splitting, and relieve them for the feed-motion.

In the accompanying drawings, A is a solid bed, immediately under or opposite the cutters, the face of which bed is at right angles with the line of action of the cutters, and resists their action while in the act of splitting the block. *a* represents a suitable frame, and *b* a table, on which slides an endless carriage, *c*, formed in sections, and linked together by chains *d* at each side, passing around suitable polygonal wheels *e e*, one set at each end, and mounted on shafts *f f*. The sections of the movable carriage *c* are formed with flanges *g g*, so as to form an endless moving trough to receive the blocks of wood to be split. One of the shafts *f* passes through the frame, and is provided with a ratchet-wheel, *h*, operated by a feed-hand, *i*, on a vibrating arm, *j*, connected with a joint-link, *k*, with a lever, *l*, drawn in one direction by a spring, *m*, and alternately forced in the opposite direction by a cam, *n*, on the driving-shaft *o*. The joint-link *k* is connected by wrist-pins, which can be shifted in slots in the vibrating arm and lever, for the purpose of adjusting the feed-motion, which is thus to be imparted to the endless carriage, to suit the size to which it may be desired to split the wood. The blocks of wood are held down upon the endless carriage and bed during the operation of the cutter or cutters by means of a plate, *p*, placed above the bed, and suspended by four rods, *q q q q*, working in guides *r r*, and connected in two pairs by two cross-braces, *s s*, with adjusting-nuts *t t* tapped into the rods, by which the height of the plate *p* above can be regulated to suit the various lengths of wood to be split. The two cross-braces rest on cams *u u* on the driving-shaft, by the rotation of which the plate is alternately lifted up from the blocks of wood, to permit the feed to take place, and then let down to hold the blocks during the operation of splitting. A sheet of india-rubber or other elastic substance, *v*, is secured to the under face of the plate *p*, to form an elastic pad, the better to hold the blocks down on the bed. The splitting-knives *w*, with the edges in the form of a cross, are secured to a stock, *x*, adapted to slide between vertical ways *y y*, and connected by a rod, *z*, with a crank, *a'*, on the driving-shaft, from which the cutters receive a reciprocating motion. The cutters pass through and work freely in a slot in plate *p*. The blocks of wood are placed on the endless carriage in such a manner that one end will be presented to the knives in the line of the grain, and so soon as the plate *p* is lifted up the feed-motion takes place to advance the blocks to the knives. The plate *p* is then permitted to descend onto and to hold the blocks in place while the cutters descend to effect the splitting, and as the cutters recede the blocks are kept down by the plate *p*, and when the cutters are cleared the plate is then lifted to permit the next feed to take place.

I do not confine myself to the form of knife described and represented, as that can be changed at pleasure, although I prefer the form described. Nor do I confine myself to the use of an endless carriage, as a reciprocating carriage will answer the purpose, but not so well. Nor do I confine myself to the making of the holding or clearing plate movable, or with an elastic pad on its under surface, as it will answer the purpose of a clearer without these features, which add to it the function of holding down the blocks firmly during the operation of splitting.

It will be obvious to the mechanician that the several parts constituting the said machine may be varied in form, or by the substitution of equivalents, and still possess the substantial mode of operation which I have invented.

Machines have been known which could be used for splitting wood, in which cruciform and V-formed blades have been employed. An endless carriage has also been employed in combination with a stationary bed, onto which the blocks were forced from the carriage, and supported while being subjected to the splitting action of the blades.

My invention is distinguished from such machines in the extension of the carriage over the frame which supports the blows of the blade, so as to carry forward the blocks and discharge the split wood from the carriage without dependence upon the weight of the blocks remaining upon the carriage. In those machines the knives were lifted by the positive action of the mechanism, and dropped, so as to act upon the blocks by the gravity of the knives and their stock passing through the bottom or bed.

In my invention the motion of the knives is positive in both directions, whereby I am able to increase the rapidity of their action, as well as to insure their efficient action on the blocks to be split. Other machines have also been known, especially intended for splitting matches, in which cruciform knives were used. In this case, however, the bed was stationary, and the block was fed forward by the action of milled rollers on one side, which, bearing against the side of the block, compressed it against a dividing-strip, and imparted to it a continuous forward movement. This construction necessitated a double motion for the knife—the reciprocating vertical splitting motion, positively produced by a crank, and at the same time a forward movement when passing through the block.

These machines were not adapted to the work of splitting numerous irregular blocks, such as are used in splitting kindling-wood, as, independent of the defect in feed, no provision is made for the lateral support of the blocks. In both these machines a slotted plate was placed above the blocks; but the plate was stationary, and not adapted to holding the blocks down on the bed, and in the match-machine it was neither designed nor fitted to act as a clearing-plate, as the block was a single piece of wood held down by the compression of the milled rollers on the side, and the slot was as much wider than the thickness of the blades as the width of a match, to allow the blade to move forward with the block; and, besides, the plate only covered a part of the area acted on by the knife, so that in operating on small irregular pieces of wood it would not act as a clearer.

What I claim as my invention, and desire to secure by Letters Patent, is—

1. The movable carriage, carrying and advancing the block of wood under the cutter, in combination with the reciprocating cutters, operating in the line of the grain of the wood, substantially as set forth.

2. In combination with the bed or frame, the movable carriage, carrying and advancing the blocks under the cutters, and the reciprocating cutters, substantially as set forth.

3. In combination with the flanged bed, which supports the pieces of wood so that the grain is in line with the cutters, the blades having a rectilinear reciprocating movement positively communicated by the crank, substantially as set forth.

4. In combination with the bed, (which supports the wood with its grain in line with the cutters,) the blades having a rectilinear reciprocating movement, positively actuated by the crank, and a clearing-plate, substantially as set forth.

5. In combination with the blades, having a reciprocating movement positively communicated by a crank, the clearing-plate, a carriage, and an intermittent feed, substantially as set forth.

6. Providing the said clearing-plate with an elastic pad, and imparting to it an up-and-down motion, substantially as specified, in its combination with the bed or carriage and reciprocating cutters, as specified, by means of which the said plate, under the combination specified, performs the double office of holding the blocks and clearing the cutters, as specified.

JACOB A. CONOVER.

Witnesses:

PETER VAN ANTWERP,

THOMAS VAN ANTWERP.